Feb. 2, 1960 R. M. MANEY 2,923,423
LININGS FOR TRUCK BODIES
Filed Oct. 9, 1957 3 Sheets-Sheet 2
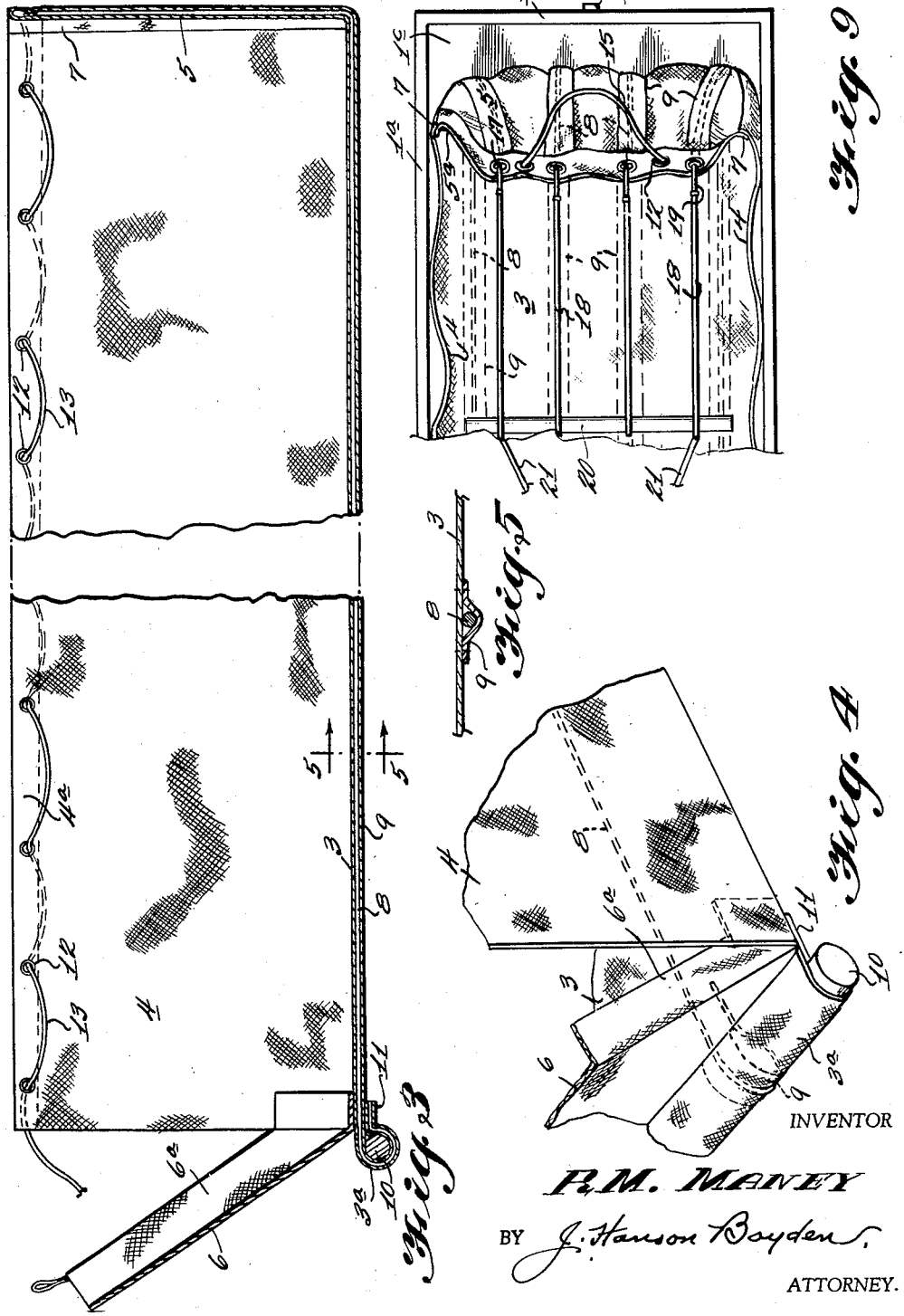
INVENTOR
R.M. MANEY
BY J. Hanson Boyden
ATTORNEY.

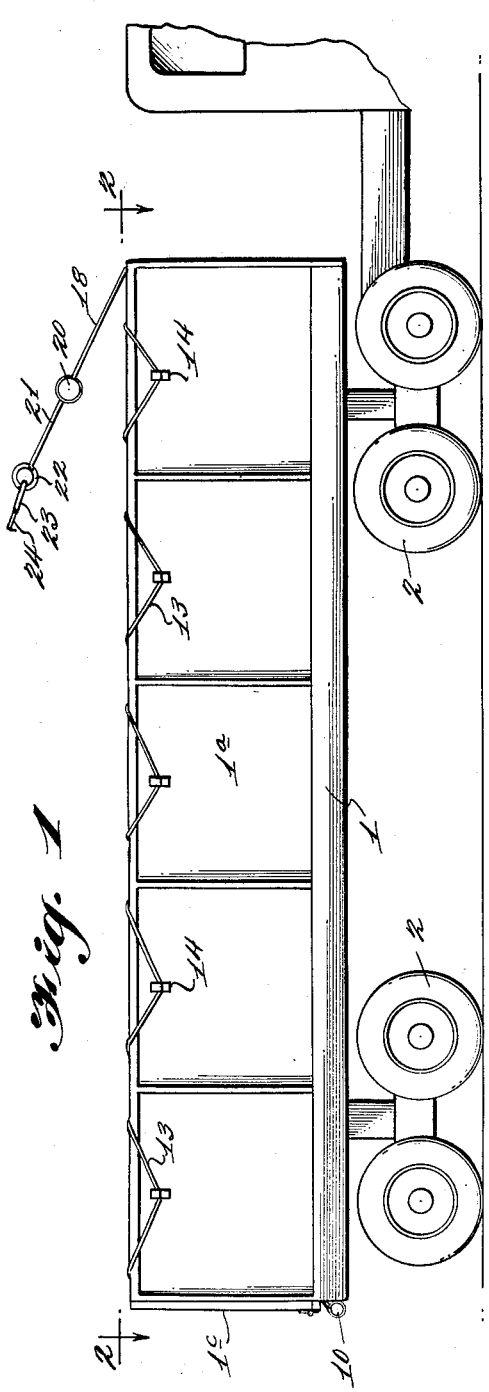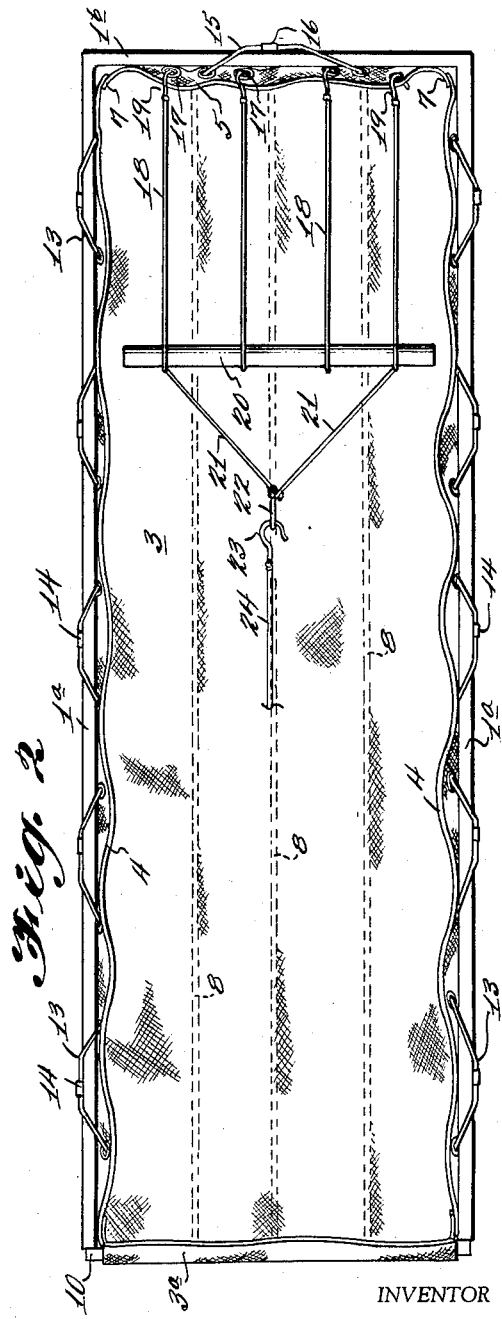

Feb. 2, 1960 R. M. MANEY 2,923,423
LININGS FOR TRUCK BODIES
Filed Oct. 9, 1957 3 Sheets-Sheet 3
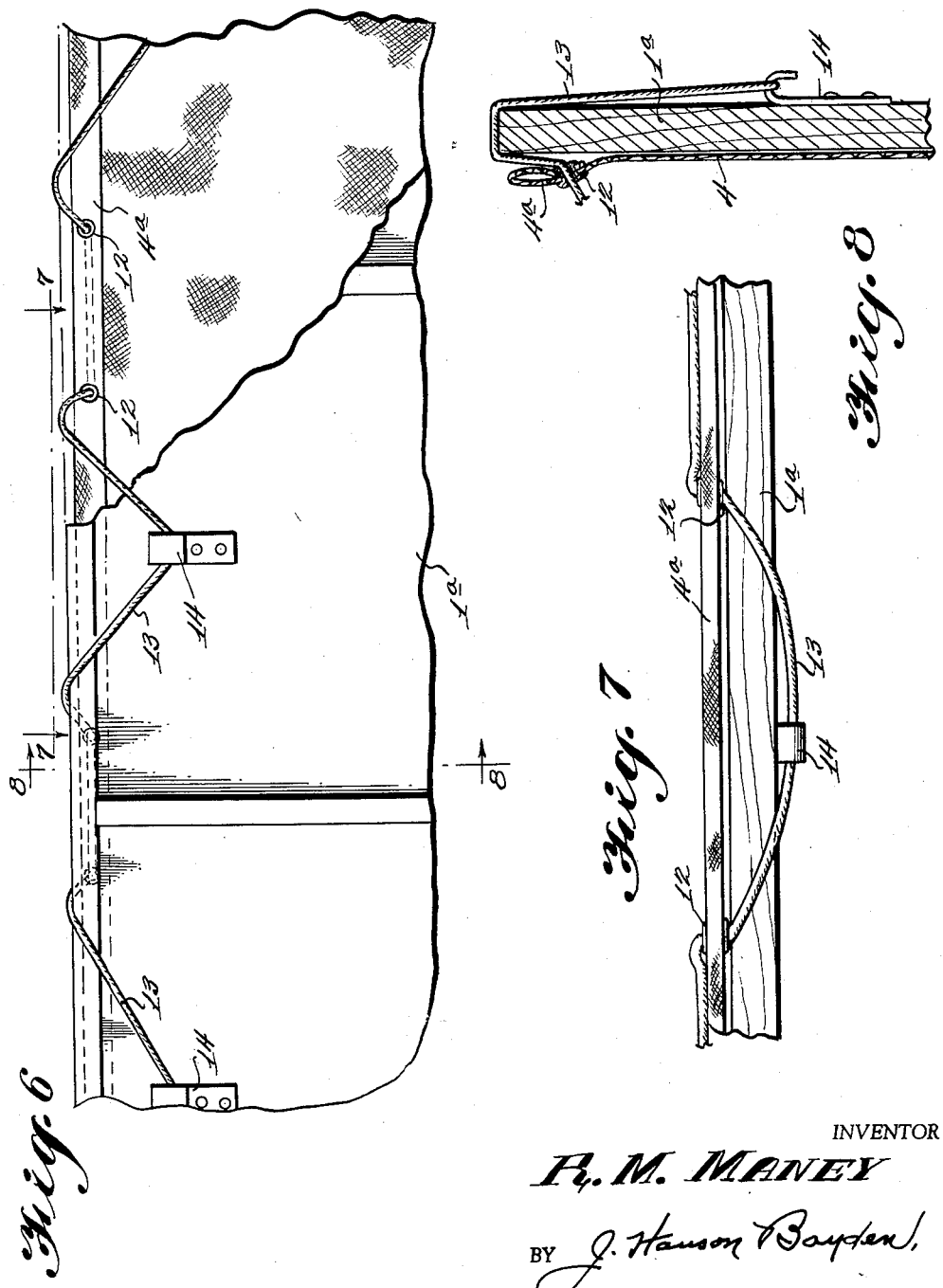
INVENTOR
R. M. MANEY
BY J. Hanson Boyden
ATTORNEY.

ial, and for
United States Patent Office 2,923,423
Patented Feb. 2, 1960

2,923,423

LININGS FOR TRUCK BODIES

Robert M. Maney, Oklahoma City, Okla.

Application October 9, 1957, Serial No. 689,219

5 Claims. (Cl. 214—82)

This invention relates to truck bodies of the box type used for hauling granular material, and more particularly to means for preventing leakage of such material, and for quickly unloading the same.

Truck bodies, as commonly constructed, are usually not entirely tight, but have, to a greater or less extent, cracks or openings, as, for example, between the bottom and the side and end walls. Consequently, if an attempt is made to handle in bulk, material such as wheat or other grains, there is likely to be substantial leakage of such material.

An object of the present invention therefore is to provide an improved liner which can be readily applied to truck bodies of ordinary construction so as to enable them to efficiently handle granular materials in bulk, without waste.

The bodies of certain types of trucks, as for example, trucks of the semi-trailer type, cannot be tilted to dump, and the unloading of granular material from such trucks is quite a laborious and time-consuming operation.

Another object of the invention is, therefore, to devise an improved lining so constructed and capable of being so manipulated that a load of granular material held therein may be quickly unloaded by dumping.

In order that the invention may be readily understood, reference is had to the accompanying drawings, forming part of this specification, and in which:

Fig. 1 is a side elevation of a conventional truck body of the semi-trailer type showing the invention as applied thereto;

Fig. 2 is a plan view thereof taken substantially along the line 2—2 of Fig. 1;

Fig. 3 is a vertical longitudinal section through the lining itself, the truck body being omitted;

Fig. 4 is a fragmentary perspective view of the rear end of the lining shown in Fig. 3;

Fig. 5 is a transverse section on the line 5—5 of Fig. 3, looking in the direction of the arrows;

Fig. 6 is a fragmentary side elevation on an enlarged scale of the upper part of a truck body, with my improved lining applied thereto, the truck body being broken away to show the lining;

Fig. 7 is a fragmentary plan view on a still further enlarged scale taken along the line 7—7 of Fig. 6;

Fig. 8 is a vertical transverse section on a still further enlarged scale substantially on the line 8—8 of Fig. 6, looking in the direction of the arrows; and Fig. 9 is a partial plan view similar to Fig. 2 but showing how the lining is manipulated to dump the load.

Referring to the drawings in detail, 1 designates the truck body which may be of the usual construction and is shown as mounted on wheels 2. This truck body comprises side walls 1$^a$, a front end wall 1$^b$, a tail gate 1$^c$ and a floor.

My improved lining, designated by the numeral 4, is constructed of strong, heavy-weight canvas or the like and comprises a bottom portion 3, side portions 4, a front end portion 5 and a rear end portion 6.

The front end portion 5 is united with the side portions 4 in any suitable way, as, for example, by lapped seams such as indicated at 7 in Figs. 1 and 9.

In order to strengthen and reinforce the floor portion of the canvas lining, I provide a plurality of ropes or cables 8 extending longitudinally of the lining from one end to the other, as shown in Figs. 2 and 3. These ropes are disposed underneath the bottom portion 3 of the lining and are held in position by strips 9 of canvas or the like sewed to the bottom portion 3 along their longitudinal edges, as most clearly shown in Fig. 5. It will be understood that these ropes extend up along the end portion 5 of the lining also and are permanently anchored to the upper edge of this end portion in any suitable way.

At the rear end of the truck body, the bottom portion of the lining, including the ropes 8, is preferably wound around a transverse bar 10, as indicated at 3$^a$ in Figs. 3 and 4, the extreme end being suitably secured underneath the bottom portion, as indicated at 11.

The upper edges of the side and front end portions of the lining are turned over to form a hem as indicated at 4$^a$ and 5$^a$, and fitting into and extending through these hems are eyelets 12. A flexible cable or rope 13 is laced through these eyelets from one side of the canvas lining to the other, as best shown in Figs. 3 and 7, it being understood that a substantial amount of slack is provided between the eyelets as shown in these figures.

Secured to the outside of the side and front end walls of the truck body are a series of hooks 14, 16.

The slack loops of the rope 13 between pairs of eyelets 12 in the upper edges of the side portions of the lining are engaged under these hooks 14 as clearly shown in the drawings. It will be noted that the rope passes outwardly through an eyelet 12 and thence up and over the top edge of the truck body before being engaged with the hooks 14. A similar looped rope 15 passes through eyelets in the upper edge of the end portion 5 and is engaged with one or more hooks 16 secured to the front end wall of the truck body, as shown in Fig. 2.

Set into the hem 5$^a$ at the upper edge of the front end portion of the lining are a series of eyelets 17, and adapted to engage these eyelets are hooks 19 carried by a plurality of relatively short ropes or cables 18. The opposite ends of these cables are secured to a cross bar 20 from which extends a bridle 21 to a ring 22 adapted to be engaged by a hook 23 carried by a rope or cable 24.

It will be noted that the lining provides a continuous, flexible, unbroken covering for the floor, side walls and front end wall of the truck body, thus rendering the body completely tight and leakproof, so that granular material, such as sand, wheat or other grains may be safely carried therein without loss.

At the rear of the body, an end portion 6 of the lining is provided, this being secured at its lower edge to the bottom portion and preferably provided with flaps 6$^a$ at its side edges adapted to overlap the rear ends of the side portions to form a tight seal when supported by the usual tail gate 1$^c$.

When it is desired to unload or dump a load of granular material, the truck is driven over a suitable unloading pit, the tail gate let down, and the rear end portion 6 of the lining released. Then the ropes 13 and 15 are loosened and disengaged from the hooks 14 and 16. Thereupon the hooks 19 are engaged in the eyelets 17 at the upper edge of the front end portion of the lining and the end of cable 24 is secured to a fixed anchor such as a suitable post or the side of a building, the anchoring point being substantially at a higher level than the top of the truck body, as indicated in Fig. 1.

When, then, the truck is driven forwardly, the front end portion of the lining is pulled rearwardly, as indicated in Fig. 9, and as the forward movement continues the lining is progressively turned inside out, thus dumping the load from the rear end of the body into the unloading pit.

It will thus be seen that I have provided an improved lining for truck bodies which is impervious to the granular material being handled so that there can be no leakage or waste of such material, together with improved means for so manipulating this lining as to quickly dump or discharge the load from the rear end of the body, and it is thought that the many advantages of the invention will be readily appreciated by those familiar with such matters.

What I claim is:

1. Means for preventing leakage of granular material from truck bodies of the box type having the usual tail gate, and for assisting in unloading the same comprising a continuous, flexible lining, impervious to the material being handled, and made up of permanently united bottom, side and end portions providing an unbroken covering for the floor, side and front end walls of the truck body, means for releasably securing said lining to the truck body, a rear end portion free at its side edges but secured at its lower edge to said bottom portion and covering and supported by said tail gate, so that it may swing downwardly to open position when said tail gate is removed, and cable means, constructed to be attached to the upper edge of said front end portion and operative, when tension is applied to it, and said securing means is released and said tail gate removed, to pull said front end, side and bottom portions of the lining rearwardly, thus dumping the load from the open rear end of the truck body.

2. Means for preventing leakage of granular material from truck bodies of the box type having the usual tail gate, and for assisting in unloading the same comprising a continuous, flexible lining, impervious to the material being handled, and made up of permanently united bottom, side and end portions providing an unbroken covering for the floor, side and front end walls of the truck body, means for releasably securing said lining to the truck body, a rear end portion secured at its lower edge to said bottom portion and covering and supported by said tail gate, said rear end portion being free at its side edges and having means at such edges co-operating with said side portions to form a leak-proof seal, cable means constructed to be attached at one end to the upper edge of said front end portion and at the other end to a fixed anchor at a point rearwardly of and above said truck body, whereby, when said cable means is thus attached, the said securing means released, the tail gate opened and the truck driven forward, said front end portion of the lining, and with it, the said side and bottom portions united thereto, will be pulled rearwardly, thus dumping the load from the rear of the truck body.

3. Means for preventing leakage of granular material from truck bodies of the box type and for assisting in unloading the same comprising a flexible lining impervious to the material being handled, said lining including a bottom portion extending over and supported on the floor of the truck body, side portions forming continuations of said bottom portion and extending up along the side walls of the truck body, and an end portion, united with both said bottom portion and said side portions, and extending up along the inside of the front end wall of the truck body, said side and end portions having openings therein adjacent their upper edges, a flexible cable passing through said openings and forming loops between adjacent pairs of openings, and means for detachably securing said loops at spaced intervals to said truck body.

4. Means for preventing leakage of granular material from truck bodies of the box type and for assisting in unloading the same comprising a flexible lining impervious to the material being handled, said lining including a bottom portion extending over and supported on the floor of the truck body, side portions forming continuations of said bottom portion and extending up along the side walls of the truck body, and an end portion, united with both said bottom portion and said side portions, and extending up along the inside of the front end wall of the truck body, said side and end portions having openings therein adjacent their upper edges, a flexible cable passing through said openings and forming loops between adjacent pairs of openings, and hooks on the outside of said truck body adapted to detachably engage said loops.

5. Means for preventing leakage of granular material from truck bodies of the box type and for assisting in unloading the same comprising a flexible lining impervious to the material being handled, said lining including a bottom portion extending over and supported on the floor of the truck body, side portions forming continuations of said bottom portion and extending up along the side walls of the truck body, and an end portion, united with both said bottom portion and said side portions, and extending up along the inside of the front end wall of the truck body, each of said side portions having a series of openings therein along its upper edge, a continuous flexible cable passing loosely through all of said openings and forming loops between adjacent pairs of openings, and a series of hooks mounted on the outside of said truck body, each said loop extending over the edge of said body and detachably engaging one of said hooks.

References Cited in the file of this patent

UNITED STATES PATENTS

| 172,228 | White | Jan. 11, 1876 |
| 1,059,058 | McDonald | Apr. 15, 1913 |
| 1,329,392 | Ford | Feb. 3, 1920 |

FOREIGN PATENTS

| 186,187 | Austria | July 10, 1956 |